United States Patent
Oishi (10) Patent No.: US 10,241,492 B2
(45) Date of Patent: Mar. 26, 2019

(54) LABEL PROCESSING APPARATUS (71) Applicant: TOSHIBA TEC KABUSHIKI KAISHA, Shinagawa-ku, Tokyo (JP)

(72) Inventor: Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/661,227

(22) Filed: Jul. 27, 2017

(65) Prior Publication Data
US 2018/0341243 A1 Nov. 29, 2018

(30) Foreign Application Priority Data
May 25, 2017 (JP) .................. 2017-103421

(51) Int. Cl.
*G06K 7/10* (2006.01)
*B65H 20/02* (2006.01)
*G05B 19/12* (2006.01)

(52) U.S. Cl.
CPC ............. *G05B 19/12* (2013.01); *B65H 20/02* (2013.01); *B65H 2301/44318* (2013.01); *G05B 2219/2621* (2013.01); *G06K 7/10297* (2013.01); *G06K 7/10376* (2013.01)

(58) Field of Classification Search
None
See application file for complete search history.

(56) References Cited

U.S. PATENT DOCUMENTS

| | | | |
|---|---|---|---|
| 6,104,291 A * | 8/2000 | Beauvillier | G06K 7/0095 340/572.1 |
| 7,327,265 B2 | 2/2008 | Tsujimura et al. | |
| 7,929,934 B2 | 4/2011 | Oishi et al. | |
| 8,111,142 B2 * | 2/2012 | Mizukawa | G06K 7/10475 340/10.5 |
| 8,224,262 B2 | 7/2012 | Oishi et al. | |
| 2002/0043322 A1 * | 4/2002 | Shiraishi | B65C 9/1823 156/64 |
| 2015/0197099 A1 * | 7/2015 | Mori | B41J 2/355 347/211 |

* cited by examiner

Primary Examiner — Carlos Garcia
(74) Attorney, Agent, or Firm — Amin, Turocy & Watson LLP (57) ABSTRACT

In accordance with an embodiment, a label processing apparatus comprises a conveyance mechanism, a radio wave shielding mechanism, an antenna and a reader/writer. The conveyance mechanism conveys a paper on which a a plurality of s are attached with a RFID tag are arranged. The radio wave shielding mechanism includes an opening moving in synchronization with each RFID tag arranged on the paper conveyed by the conveyance mechanism. The antenna receives and transmits a radio wave for communication via the opening while the opening moves in synchronization with the RFID tag. The reader/writer communicates with the RFID tag of the paper conveyed by the conveyance mechanism via the antenna.

18 Claims, 6 Drawing Sheets

LABEL PROCESSING APPARATUS

CROSS-REFERENCE TO RELATED APPLICATION

This application is based upon and claims the benefit of priority from Japanese Patent Application No. P2017-103421, filed May 25, 2017, the entire contents of which are incorporated herein by reference.

FIELD

Embodiments described herein relate generally to a label processing apparatus and methods related thereto.

BACKGROUND

Conventionally, there is a label issuing apparatus for issuing a label with a RFID (Radio Frequency Identification) tag attached thereto. The label issuing apparatus includes a conveyance mechanism for conveying a label with the RFID tag attached thereto, a reader/writer for communicating with the RFID tag via an antenna, and a controller for controlling each section. A label issuing process writes data in the RFID tag of the label by the reader/writer by performing a wireless communication with the RFID tag.

However, in order to definitely write the data in one RFID tag, the label issuing apparatus writes the data in the RFID tag of a label temporarily stopped at a predetermined position. As the label issuing apparatus temporarily stops the conveyance of the label in order to definitely write the data in the RFID tag, there is a problem that significant time is wasted in the label issuing process.

DETAILED DESCRIPTION

In accordance with an embodiment, a label processing apparatus comprises a conveyance mechanism, a radio wave shielding mechanism, an antenna and a reader/writer. The conveyance mechanism conveys a paper on which a plurality of labels are attached, each label with at least one RFID tag. The radio wave shielding mechanism includes an opening moving in synchronization with each RFID tag arranged on the paper conveyed by the conveyance mechanism. The antenna receives and transmits a radio wave for communication via the opening while the opening moves in synchronization with the RFID tag. The reader/writer communicates with the RFID tag of the paper conveyed by the conveyance mechanism via the antenna.

In accordance with another embodiment, label processing method involving conveying a paper on which a plurality of labels are arranged, each label attached with at least one RFID tag; moving an opening within a radio wave shielding mechanism in synchronization with each RFID tag conveyed; receiving and transmitting a radio wave for communication via the opening while the opening moves in synchronization with the RFID tag; and communicating with the RFID tag via an antenna. Hereinafter, a first embodiment and a second embodiment are described with reference to the accompanying drawings.

First, a label issued by a label issuing apparatus as a label processing apparatus according to each embodiment is described.

Figure 1:
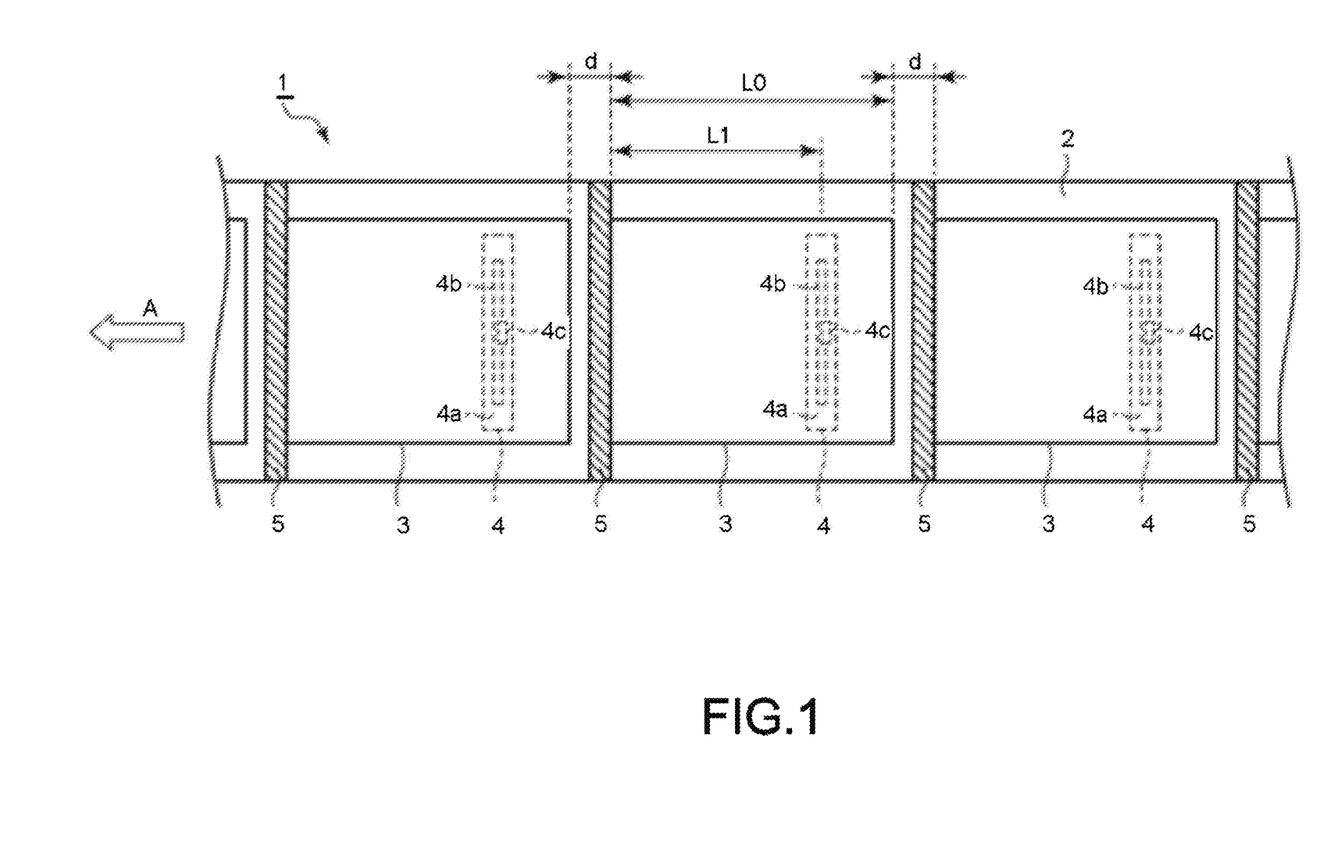
FIG. 1 is a diagram exemplifying the constitution of a label issued by a label issuing apparatus as a label processing apparatus according to an embodiment.

FIG. 1 is a diagram exemplifying the constitution of a label paper 1 issued by the label issuing apparatus.

As shown in FIG. 1, the label paper 1 includes a belt-like mount 2 and a plurality of rectangular labels 3 attached to a surface of the mount 2. A plurality of the labels 3 is arranged in a row at a certain interval in a longitudinal direction (conveyance direction A of the label 3) of the mount 2. In the constitution example in FIG. 1, a plurality of the labels 3 whose length (overall length) in the conveyance direction A is L0 is arranged in a row on the surface of the mount 2 at an interval d.

Each label 3 includes a RFID tag 4. The RFID tag 4 is arranged at an adhesive surface side with the mount 2 of each label 3. The RFID tag 4 has a wireless communication function. The RFID tag 4, also referred to as an IC tag, is a passive tag without battery. The RFID tag 4 has an inlay 4a, an antenna 4b and an IC chip 4c. The IC chip 4c is an integrated circuit including a processor, a storage section, an interface and the like. The processor of the IC chip 4c executes a program such as an operation control. The storage section of the IC chip 4c stores the program executed by the processor, an ID, and other data. The interface of the IC chip 4c is connected to the antenna 4b.

A mounting position of the RFID tag 4 in the label 3 is determined by a type of the label paper 1. In the constitution example shown in FIG. 1, on the label paper 1, the RFID tag 4 is arranged at a position a distance L1 (L1<L0) away from a tip with respect to the overall length L0 in the same direction as the conveyance direction A of the label 3. The antenna 4b of the RFID tag 4 is arranged in such a manner that the longitudinal direction thereof is orthogonal to the conveyance direction A. On the label paper 1, an interval between the RFID tags 4 respectively attached to the adjacent label 3 is L0+d, which is constant.

The label paper 1 includes a mark 5 at a tip side of the label 3 on the surface of the mount 2. The mark 5 indicates the head of the label 3 on the mount 2. The label paper 1 constituted as stated above is, for example, set in the label issuing apparatus described later in a state of being wound into a roll shape.

First Embodiment

The first embodiment is described.

Figure 2:
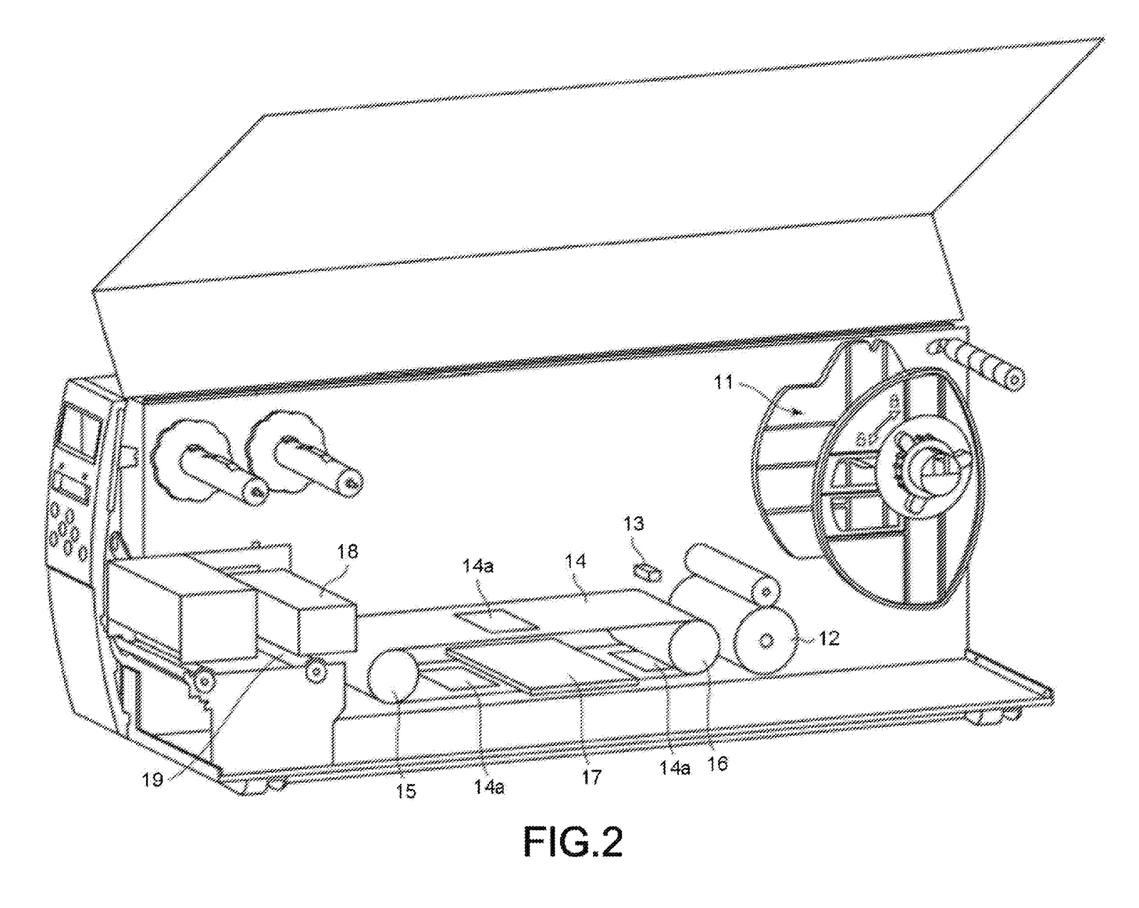
FIG. 2 is a diagram exemplifying the internal constitution of a label issuing apparatus according to a first embodiment.
Figure 3:
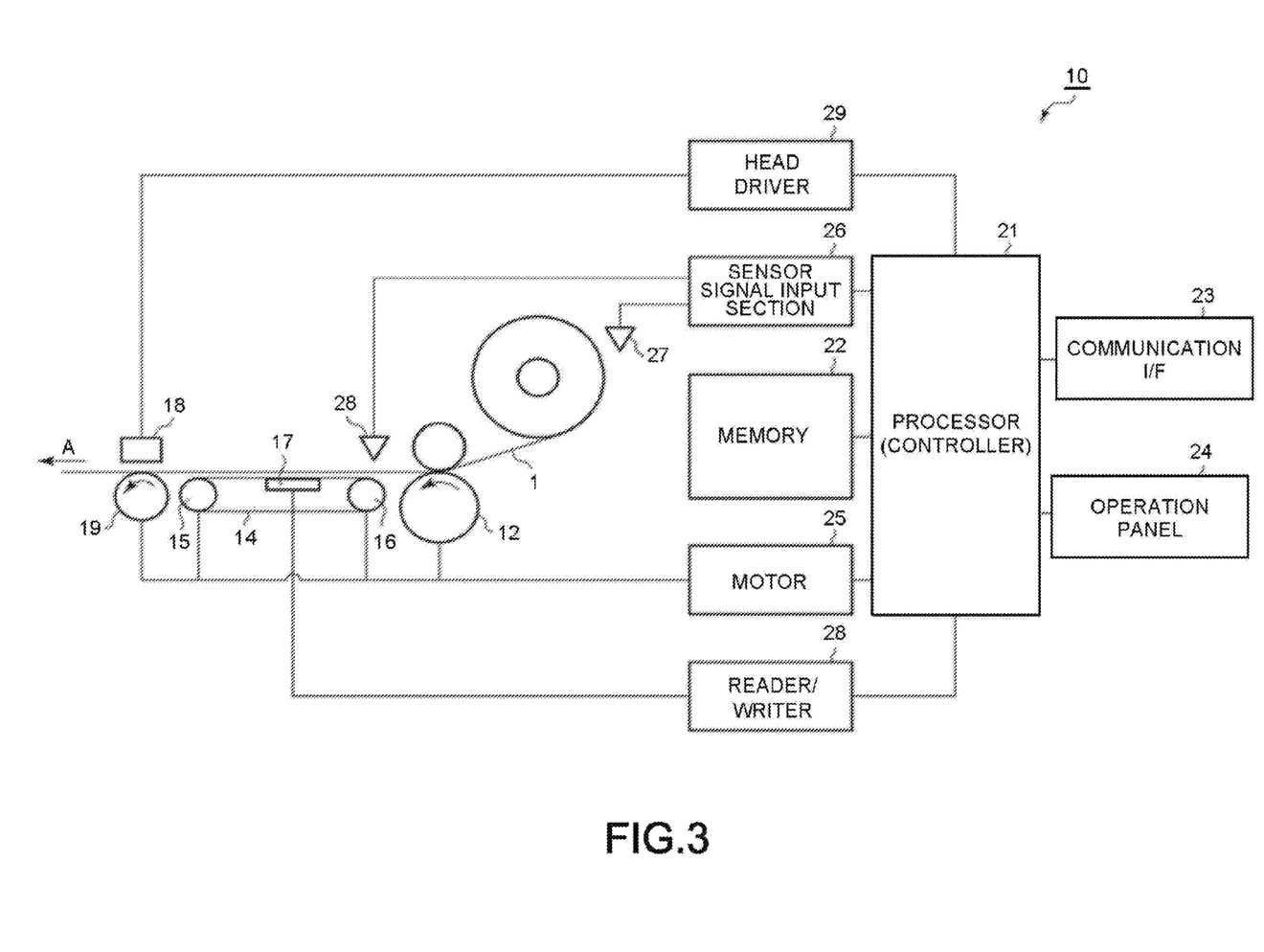
FIG. 3 is a diagram exemplifying the constitution of a control system in the label issuing apparatus according to the first embodiment.

FIG. 2 is a diagram exemplifying the internal constitution of a label issuing apparatus 10 according to the first embodiment. FIG. 3 is a diagram exemplifying the constitution of a control system and an electrical connection relationship with each section of the control system in the label issuing apparatus 10 according to the first embodiment.

In the label issuing apparatus 10, a label holding section 11, a conveyance roller 12, a mark sensor 13, a belt 14, belt rollers 15 and 16, an antenna 17, a printing head 18, and a platen roller 19 are arranged.

In the label issuing apparatus 10, the label holding section 11 holds the label paper 1 wound into a roll shape. The conveyance roller 12 and the platen roller 19 draw out the label paper 1 set in the label holding section 11 to convey it in a predetermined conveyance direction (for example, an arrow A direction shown in FIG. 2 and FIG. 3). In a conveyance path of the label paper by the conveyance roller 12 and the platen roller 19, from the upstream side in the conveyance direction A, the mark sensor 13, the antenna 17 and the printing head 18 are arranged in order.

The mark sensor 13 detects the mark 5 for detecting the position of each label 3 in the label paper 1. The mark sensor 13, for example, optically detects the mark 5 provided on the label paper 1. The mark sensor 13 scans the surface of the conveyed label paper 1 along the conveyance direction A. The mark sensor 13 outputs a signal to turn on if detecting an edge of the mark 5 positioned in front of the label paper 1 in the conveyance direction A and to turn off if detecting the edge of the mark 5 positioned behind.

The belt 14 is arranged along the conveyance path of the label paper 1 between the conveyance roller 12 and the platen roller 19. The belt 14 is supported by the belt rollers 15 and 16. The belt 14 is made up of a member shielding a radio wave and includes one or a plurality of opening 14a. For example, the belt 14 is made of a conductor such as a metal provided with the opening 14a. In the constitution example shown in FIG. 2, the belt 14 having three openings 14a is supported by the belt rollers 15 and 16 to be arranged along the conveyance path of the label paper 1. The belt 14 is driven according to the rotation of the belt rollers 15 and 16. The belt 14 is driven to move in synchronization with the RFID tag 4 of the label paper 1 passing through the opening 14a. The belt 14 supported and driven by the belt rollers 15 and 16 functions as a radio wave shielding mechanism.

The antenna 17 transmits and receives the radio wave for communicating with the RFID tag 4. The antenna 17 is arranged at the inner side of the belt 14 supported by the belt rollers 15 and 16. The antenna 17 is arranged at a position surrounded by the belt 14. Therefore, the antenna 17 can transmit and receive the radio wave with the RFID tag 4 of the label paper conveyed along the belt 14 via the opening 14a. The relationship among the belt 14, the antenna 17 and the label paper 1 is described in detail later.

The printing head 18 prints information on a printing surface of the label 3 on the conveyed label paper 1. In the constitution example shown in FIG. 2, the printing head 18 prints the information on the printing surface (a surface opposite to a surface to which the RFID tag 4 is attached) of the label 3 conveyed on the platen roller 19. The printing head 18 is, for example, a thermal head having many resistance heating body linearly arranged to print the information via an ink ribbon on the printing surface of the label 3. The printing head 18 is not limited to print in a prescribed printing method as long as it is a printing mechanism capable of printing the information on the label 3.

The constitution of the control system in the label issuing apparatus 10 according to the first embodiment is described.

As shown in FIG. 3, the label issuing apparatus 10 includes a processor (controller) 21 for controlling each section. A memory 22, a communication I/F 23, an operation panel 24, a motor 25, a sensor signal input section 26, a reader/writer 28 and a head driver 29 are connected to the processor 21.

The processor 21 is composed of, for example, a CPU (Central Processing Unit). The processor 21 realizes various functions as the label issuing apparatus 10 by controlling each section according to a program stored in the memory 22. For example, the processor 21 issues the label if an issuing processing of the label is instructed by the operation panel 24.

The memory 22 includes a ROM (Read Only Memory) and a RAM (Random Access Memory). The ROM is a nonvolatile memory composed of, for example, a flash memory. Various programs for operating the label issuing apparatus 10 are stored in the ROM in the memory 22. The ROM is used for storing the programs. The RAM functions as various working areas such as an area for copy or decompressing a program. The processor 21 executes various processing according to a program stored in the ROM in the memory 22 by using the RAM in the memory 22 as a work area.

The communication interface (I/F) 23 is used for communicating with an external device (host device). For example, the communication I/F 23 is used as an interface for inputting data to be printed on the label 3 and data to be written in the RFID tag 4.

The operation panel 24 has an interface function with a user (operator). The operation panel 24 is composed of, for example, a display device attached with a touch panel. In the operation panel 24, an operator inputs an instruction to start issuing the label.

The motor 25 rotates the conveyance roller 12 and/or the platen roller 19. In the constitution example shown in FIG. 3, the motor 25 rotates the conveyance roller 12 and the platen roller 19 in a direction indicated by an arrow in FIG. 3. By the rotation of the conveyance roller 12 and the platen roller 19, the label paper 1 is conveyed in the conveyance direction A. The motor 25 rotates the belt rollers 15 and 16. The motor 25 drives the belt 14 by rotating the belt rollers 15 and 16 in synchronization with a conveyance speed of the label paper 1 by the conveyance roller 12 and the platen roller 19.

The belt rollers 15 and 16 may be optional as long as they can drive the belt 14 in such a manner that the opening 14a moves in synchronization with the RFID tag 4 of the label paper 1 being conveyed. For example, the belt rollers 15 and 16 may be rotated by a motor other than the motor 25 rotating the conveyance roller 12 and the platen roller 19. The belt rollers 15 and 16 may be driven by being linked with the conveyance roller 12 and the platen roller 19, or may be controlled to be driven independently.

The belt rollers 15 and 16 may be adjusted so that the position of the opening 14a is synchronized with the position of RFID tag 4 in the issuing processing. For example, by arranging a sensor for detecting the position of the opening 14a of the belt 14, the processor 21 may determine the positional relationship between the RFID tag 4 and the opening 14a. By executing the determination in the issuing processing, the processor 21 can perform adjustment so that the position of the RFID tag 4 is synchronized with the position of the opening 14a.

The sensor signal input section 26 inputs a signal from various sensors including the mark sensor 13. In various sensors, an opening and closing sensor 27 for detecting opening or closing of a member that is opened or closed to exchange the label paper 1 such as a cover, a door, or a lid is also contained. For example, an optical sensor that is turned on through closing or opening of the member is applied to the opening and closing sensor 27. Alternatively, a mechanical switch for switching on and off by opening and closing of the member may be applied. For example, the opening and closing sensor 27 detects the closing or opening of the member that is opened or closed to exchange the label paper 1 set in the label holding section 11.

The reader/writer 28 executes the wireless communication with the RFID tag 4 via the antenna 17. The reader/writer 28 emits unmodulated wave from the antenna 17 to start the RFID tag 4 to execute the wireless communication with the RFID tag 4. The RFID tag 4 is started by receiving the unmodulated wave from the antenna 17. The reader/writer 28 executes a reading processing and a writing processing of the data on the RFID tag 4 by sending various commands to the started RFID tag 4.

For example, the reader/writer 28 modulates the amplitude of the unmodulated wave emitted from the antenna 17 with a signal obtained by encoding communication data. The RFID tag 4 receives the communication data subjected to the amplitude modulation and demodulates it to return a response wave by changing the load of the antenna. The reader/writer 28 reads the data of the RFID tag 4 by receiving the response wave from the RFID tag 4 by the antenna 17. In a case of writing the data to the RFID tag 4, the reader/writer 28 also executes the writing processing of the data to the RFID tag 4 by the same processing procedure as above.

In the issuing processing of the label, the reader/writer 28 completes the writing of the desired data by sequentially executing the reading processing, the writing processing and a confirmation reading processing on the RFID tag 4. The processing on the RFID tag 4 in the label issuing processing is executed within a period during which the antenna 17 can transmit and receive the radio wave to and from the RFID tag 4. The reader/writer 28 can communicate with the RFID tag 4 during the period (communication available period) during which the opening 14a of the belt 14 moves in synchronization with the RFID tag 4.

The head driver 29 is connected to the printing head 18. The head driver 29 drives the printing head 18. The head driver 29 drives the printing head 18 according to the print data from the processor 21 to print the print data on the label 3 conveyed on the platen roller 19.

The label 3 having the RFID tag 4 to which the data writing is not completed in the above-mentioned communication available period is processed as an unusable label. Therefore, the head driver 29 may print with the printing head 18 that the label 3 of the RFID tag 4 to which the data writing is not completed is unusable.

Figure 4:
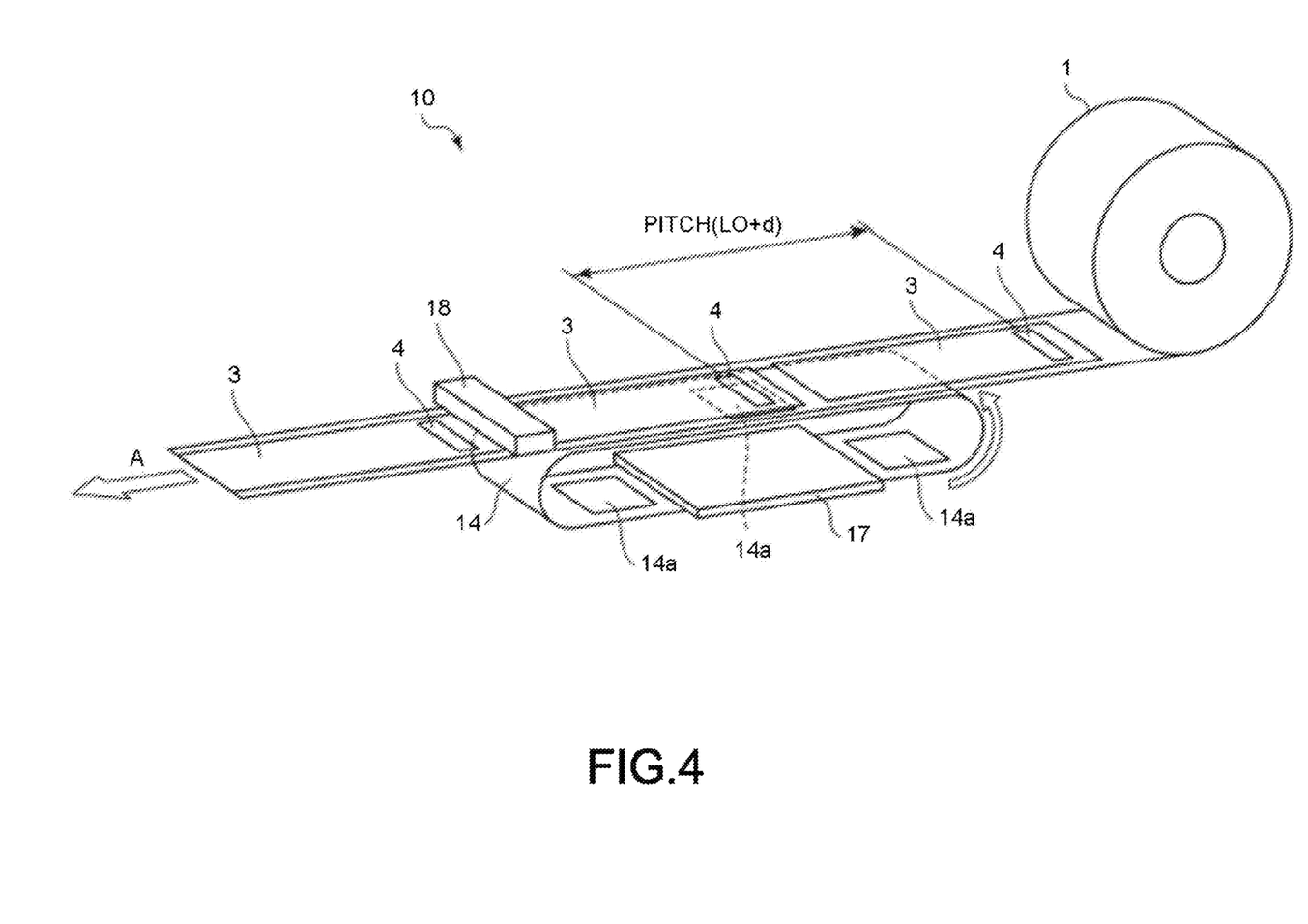
FIG. 4 is a diagram illustrating the relationship between a belt and a label paper in the label issuing apparatus according to the first embodiment.

The relationship between the opening 14a of the belt 14 and the RFID tag 4 in the label issuing apparatus 10 according to the first embodiment is described in detail.

FIG. 4 is a perspective view illustrating the positional relationship between the belt 14 and the label paper 1 in the label issuing apparatus 10.

The belt 14 is made of a member shielding the radio wave, and is made of a conductor such as a metal. The belt 14 includes one or a plurality of openings 14a. The opening 14a has a shape capable of containing at least the antenna 4b of the RFID tag 4. For example, in the example shown in FIG. 4, the belt 14 is provided with the opening 14a which is a rectangular area larger than the rectangular area of the whole RFID tag 4.

The belt 14 shields the radio wave emitted from the antenna 17 and also has an effect of changing an alignment state with the antenna 4b of the RFID tag 4. The opening 14a through which the radio wave passes does not affect the alignment state with the antenna 4b of the RFID tag 4. The reader/writer 28 can communicate with the RFID tag 4 at a position coincident with the opening 14a. Contrarily, the RFID tag 4 at a position that is not coincident with the opening 14a cannot communicate with the reader/writer 28.

In the constitution example shown in FIG. 4, the interval of the opening 14a in the belt 14 is set equal to a pitch (L0+d) at which the RFID tags on the label paper 1 are arranged. Therefore, if the conveyance speed of the label paper 1 and a driving speed of the belt 14 are the same, the opening 14a and the RFID tag 4 can move synchronously. The conveyance of the label paper 1 and the driving of the belt 14 are adjusted so that the opening 14a overlaps with the RFID tag 4. For example, the processor 21 adjusts the timing to drive the belt 14 according to the timing at which the mark sensor 13 detects the mark 5 of the label paper 1.

If the processor 21 adjusts the conveyance of the label paper 1 and the driving of the belt 14, the opening 14a is always located under each RFID tag 4 on the label paper 1. In the example shown in FIG. 4, the pitch of the RFID tag 4 is L0+d. Therefore, in the constitution example shown in FIG. 4, the reader/writer 28 can secure the communication period with one RFID tag 4 while the label paper 1 moves by L0+d.

In the constitution example shown in FIG. 4, the pitch of the RFID tag 4 on the label paper 1 and the pitch of the opening 14a in the belt 14 are the same interval (L0+d). For this reason, the period during which the reader/writer 28 communicates with one RFID tag 4 is a period during which the label paper 1 moves by the distance L0+d. For example, the belt 14 is constituted in such a manner that a period during which one opening 14a moves in synchronization with one RFID tag 4 falls within a period during which the label paper 1 moves by the distance L0+d. Such a constitution may be realized by setting the interval between the belt roller 15 and the belt roller 16 supporting the belt 14 within L0+d.

As described above, the label issuing apparatus according to the first embodiment is provided with the antenna inside the belt with the opening that moves in synchronization with the RFID tag on the conveyed label paper. As a result, the label issuing apparatus according to the first embodiment can secure the communication period between one reader/writer and each RFID tag without stopping the conveyance of the label paper. As a result, it is possible to provide the label issuing apparatus which can execute a label processing quickly and easily on the label paper on which the label with a plurality of RFID tags is arranged.

The label issuing apparatus according to the first embodiment does not need to perform the communication processing with each RFID tag by arranging a plurality of the antennas in a distributed manner in the long conveyance path. Therefore, according to the first embodiment, the data can be written to each RFID tag being conveyed by one antenna, and the label processing can be executed simply and at high speed while suppressing rising in the size of the apparatus.

Second Embodiment

The second embodiment is described.

Figure 5:
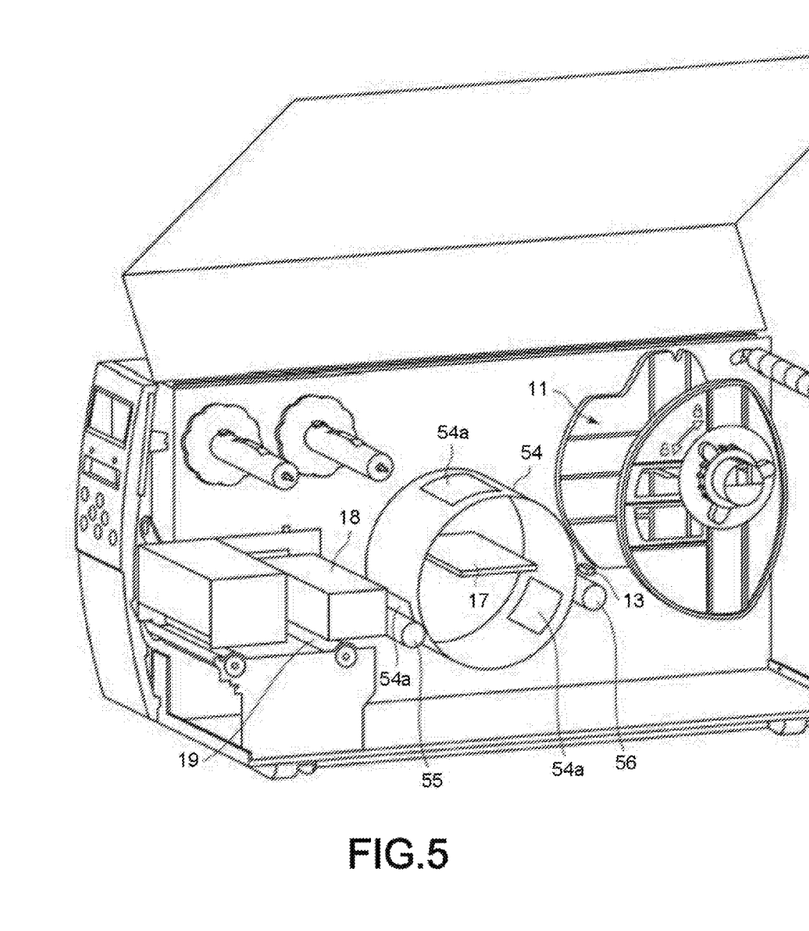
FIG. 5 is a diagram exemplifying the internal constitution of the label issuing apparatus according to a second embodiment.

FIG. 5 is a diagram exemplifying the internal constitution of a label issuing apparatus 100 according to the second embodiment.

The label issuing apparatus 100 shown in FIG. 5 is constituted by replacing the belt 14 of the label issuing apparatus 10 shown in FIG. 2 and FIG. 3 described in the first embodiment with a drum 54. The label issuing apparatus 100 can be realized by the same components as the label issuing apparatus 10 described in the first embodiment except for the drum 54 and the periphery of the drum 54. For this reason, in the second embodiment, a detailed description of the constitution other than the drum 54 and the periphery of the drum 54 is omitted.

The drum 54 is arranged in the conveyance path of the label between the label holding section 11 and the platen roller 19. The drum 54 has a cylindrical shape and rotates in a circumferential direction. The drum 54 is composed of a member shielding the radio wave and has one or a plurality of openings 54a on the circumferential surface. For example, the drum 54 has a constitution in which a conductor such as a metal is formed in a cylindrical shape and the opening 54a is provided on the circumferential surface.

In the vicinity of the circumferential surface of the drum 54, a drum roller 55 is arranged at the side of the label holding section 11, and a drum roller 56 is arranged at the side of the printing head 18. The drum roller 55 sends out the label paper 1 sent from the label holding section 11 side along the circumference of the drum 54. The drum roller 56 sends the label paper 1 conveyed along the circumference of the drum 54 to the printing head 18 and the platen roller 19. In the constitution example shown in FIG. 5, the drum rollers 55 and 56 are provided so that the label paper 1 is conveyed along the circumferential surface of the drum 54 provided with three openings 54a. The drum 54 where the drum rollers 55 and 56 are arranged functions as the radio wave shielding mechanism.

The antenna 17 is arranged inside the cylindrical drum 54. The antenna 17 is arranged at a position surrounded by the drum 54. For this reason, the antenna 17 can transmit and receive the radio wave to and from the RFID tag 4 of the label paper 1 conveyed along the circumferential surface of the drum 54 via the opening 54a of the drum 54.

The label issuing apparatus 100 is controlled to be driven by the control system as shown in FIG. 3. The drum 54 is rotated by a motor 25 which drives according to the control of the processor 21. In the label issuing apparatus 100 according to the second embodiment, the drum 54 is rotated in such a manner that the opening 54a on the circumferential surface moves at the same speed as the conveyance speed of the label paper 1. The drum 54 is controlled to be driven in such a manner that the opening 54a provided on the circumferential surface moves in synchronization with the conveyance speed of the RFID tag 4 on the label paper 1.

Figure 6:
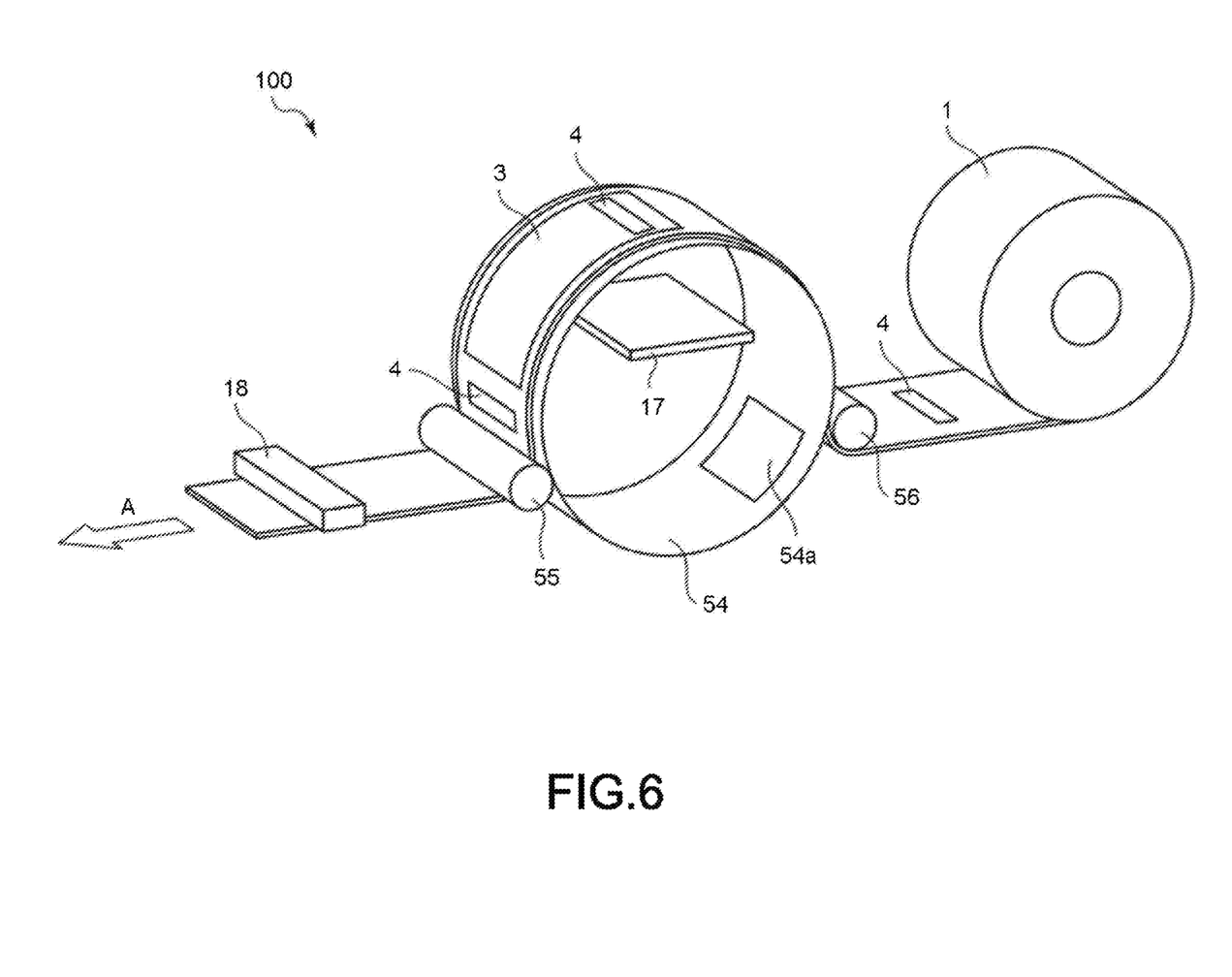
FIG. 6 is a diagram illustrating the relationship between a drum and a label paper in the label issuing apparatus according to the second embodiment.

The relationship between the opening 54a of the drum 54 and the RFID tag 4 in the label issuing apparatus 100 according to the second embodiment is described in detail.

FIG. 6 is a perspective view illustrating the relationship between the drum 54 and the label paper 1 in the label issuing apparatus 100.

As mentioned above, the drum 54 is formed of a conductor such as a metal shielding the radio wave and has a cylindrical constitution with one or a plurality of the opening 54a on the circumferential surface. The opening 54a provided on the circumferential surface of the drum 54 has a shape that can include at least the antenna 4b of the RFID tag 4. For example, in the example shown in FIG. 6, the drum 54 is provided with the opening 54a having a rectangular area larger than the rectangular area of the whole RFID tag 4.

The drum 54 shields the radio wave emitted from the antenna 17 of the reader/writer and changes the alignment state of the antenna 4b of the RFID tag 4. The opening 54a through which the radio wave emitted from the antenna 17 passes does not affect the alignment state of the antenna 4b of the RFID tag. In other words, the reader/writer 28 can communicate with the RFID tag 4 located at the position coincident with the opening 54a, and cannot communicate with the RFID tag 4 located at the position that is not coincident with the opening 54a.

In the example shown in FIG. 6, the interval of each opening 54a on the circumferential surface of the drum 54 is designed to be equal to the pitch (L0+d) at which each RFID tag 4 is placed on the label paper 1. Therefore, if the conveyance speed of the label paper 1 and the speed of the circumferential surface of the drum 54 are the same, the opening 54a and the RFID tag 4 can move synchronously. The rotation of the drum 54 is adjusted in such a manner that the opening 54a overlaps with the RFID tag 4 in accordance with the conveyance of the label paper 1. For example, the processor 21 adjusts the timing to rotate the drum 54 according to the timing at which the mark sensor 13 detects the mark 5 of the label paper 1.

If the conveyance of the label paper 1 and the rotation of the drum 54 are adjusted, each RFID tag 4 exists at a position overlapping with the opening 54a while moving along the circumferential surface of the drum 54. In the example shown in FIG. 6, the pitch of each RFID tag 4 on the label paper 1 is L0+d. In this case, the communication period between the reader/writer 28 and one RFID tag 4 can be secured within a period during which the label paper 1 moves by L0+d.

In the constitution example shown in FIG. 6, the pitch of the RFID tag 4 on the label paper 1 and the pitch of the opening 54a on the circumferential surface of the drum 54 are the same interval (L0+d). For this reason, the period during which the antenna 17 can communicate with one RFID tag 4 falls within a period during which the label paper 1 moves by the distance L0+d. For example, the distance by which the label paper 1 is conveyed along the circumferential surface of the drum 54 by the drum rollers 55 and 56 may be within L0+d.

As described above, the label issuing apparatus according to the second embodiment is provided with the antenna in the drum provided with the opening which moves in synchronization with the RFID tag on the conveyed label paper. As a result, the label issuing apparatus according to the second embodiment can secure the communication period between one reader/writer and each RFID tag without stopping the conveyance of the label paper. As a result, it is possible to provide the label issuing apparatus which can execute the label processing quickly and easily on the label paper on which the label with a plurality of RFID tags is placed.

The label issuing apparatus according to the second embodiment does not need to arrange a plurality of the antennas in a distributed manner through arranging the long conveyance path in order to communicate with the RFID tag being conveyed. According to the second embodiment, it is possible to realize the data writing to the RFID tag being conveyed with a simple constitution including one antenna, and to suppress an increase in size of the apparatus and an increase in manufacturing cost.

In the label issuing apparatus according to the second embodiment, the drum provided with the opening may be optional as long as it is only formed in a cylindrical shape and can be easily molded with various materials such as metal. Furthermore, in the label issuing apparatus according to the second embodiment, since the drum having the opening is cylindrical, it is possible to suppress that the conveyance path becomes longer, and it is easy to downsize the apparatus.

The mechanism (radio wave blocking mechanism) for moving the opening capable of transmitting and receiving the radio wave which shielding the radio wave in synchronization with the RFID tag is not limited to the constitution described in the first or second embodiment. The radio wave shielding mechanism may be any mechanism as long as it can move the opening capable of transmitting and receiving the radio wave in such a manner that only the RFID tag to be processed can communicate with. For example, the radio wave shielding mechanism may have the constitution in which the opening provided in a shielding object of the radio wave moves from the predetermined position to the conveyance direction together with the RFID tag to return to the predetermined position after completing the writing of the data.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A label processing apparatus, comprising:
   a conveyance mechanism configured to convey a paper on which a plurality of labels each attached with at least one RFID tag are arranged;
   a radio wave shielding mechanism having an opening there through, wherein the opening rotates in synchronization with each RFID tag arranged on the paper conveyed by the conveyance mechanism;
   an antenna configured to receive and transmit a radio wave for communication via the opening while the opening rotates in synchronization with the RFID tag; and
   a reader/writer configured to communicate with the RFID tag of the paper conveyed by the conveyance mechanism via the antenna.

2. The label processing apparatus according to claim 1, wherein the radio wave shielding mechanism comprises a conductor provided with the opening.

3. The label processing apparatus according to claim 2, wherein the conductor comprises the opening at an interval corresponding to an arrangement interval of each RFID tag on the paper, and rotates in synchronization with a conveyance speed of the paper.

4. The label processing apparatus according to claim 1, wherein the radio wave shielding mechanism comprises the opening in a belt rotating in synchronization with the conveyance of the paper by the conveyance mechanism.

5. The label processing apparatus according to claim 4, wherein the radio wave shielding mechanism comprises a plurality of openings in the belt.

6. The label processing apparatus according to claim 5, wherein an interval of the openings in the belt equals a pitch at which the RFID tags on the labels are arranged.

7. The label processing apparatus according to claim 4, wherein the conveyance mechanism comprises a conveyance roller and a platen roller, the radio wave shielding mechanism is configured to rotate by a pair of belt rollers separate from the conveyance roller and the platen roller.

8. The label processing apparatus according to claim 1, wherein the radio wave shielding mechanism comprises the opening in a drum rotating in synchronization with the conveyance of the paper by the conveyance mechanism.

9. The label processing apparatus according to claim 8, wherein the radio wave shielding mechanism comprises a plurality of openings in the drum.

10. The label processing apparatus according to claim 9, wherein an interval of the openings in the drum equals a pitch at which the RFID tags on the labels are arranged.

11. The label processing apparatus according to claim 8, wherein the conveyance mechanism comprises a conveyance roller and a platen roller, the radio wave shielding mechanism is configured to rotate by a pair of drum rollers separate from the conveyance roller and the platen roller.

12. A label processing method, comprising:
    conveying a paper on which a plurality of labels are arranged, each label attached with at least one RFID tag;
    rotating an opening there through within a radio wave shielding mechanism in synchronization with each RFID tag conveyed;
    receiving and transmitting a radio wave for communication via the opening while the opening rotates in synchronization with the RFID tag; and
    communicating with the RFID tag via an antenna.

13. The label processing method according to claim 12, further comprising:
    rotating the opening there through in synchronization with a conveyance speed of the paper.

14. The label processing method according to claim 12, wherein:
    rotating the opening there through comprises rotating a belt having the opening.

15. The label processing method according to claim 12, wherein rotating the opening comprises rotating a drum having the opening.

16. The label processing method according to claim 15, wherein the drum has a plurality of openings there through.

17. The label processing method according to claim 16, wherein an interval of the openings in the drum equals a pitch at which the RFID tags on the labels are arranged.

18. A RFID label making apparatus, comprising:
    a conveyance mechanism configured to convey a paper on which a plurality of labels each attached with a RFID tag are arranged;
    a radio wave shielding mechanism having a plurality of openings there through configured so that a single opening rotates in synchronization with a single RFID tag;
    an antenna configured to receive and transmit a radio wave for communication via the plurality of openings while the single opening rotates in synchronization with the single RFID tag; and
    a reader/writer configured to communicate with the RFID tag of the paper conveyed by the conveyance mechanism via the antenna.

* * * * *